Dec. 6, 1932.  R. M. WOODS  1,889,882
CONTAINER FOR FOOD PRODUCTS
Filed Nov. 11, 1931
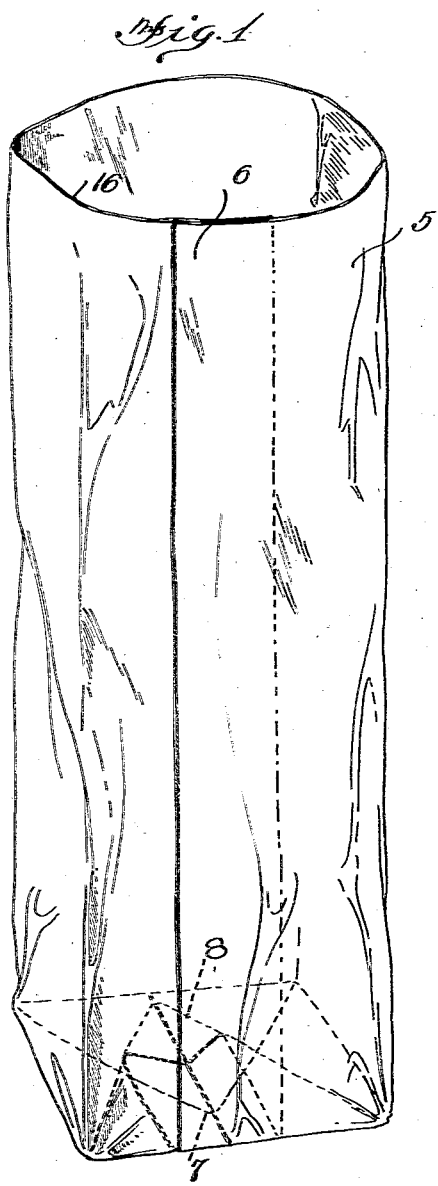
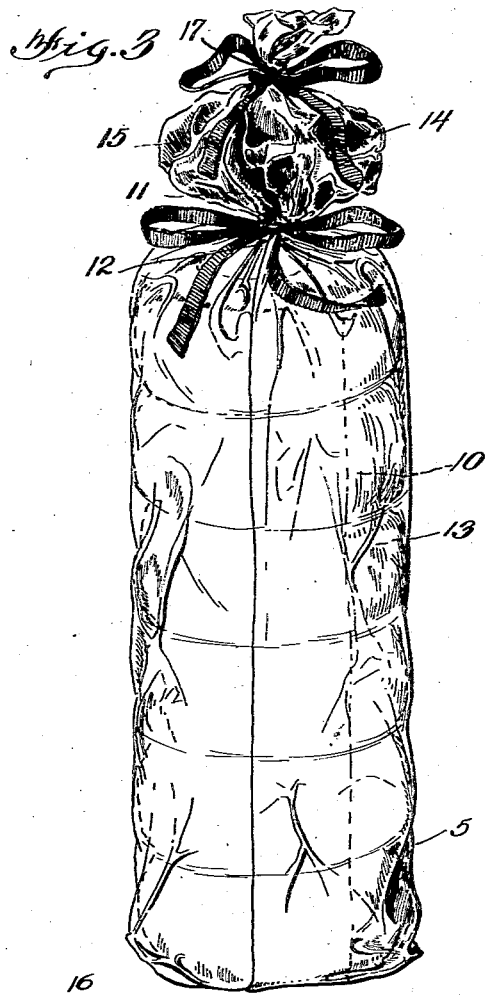
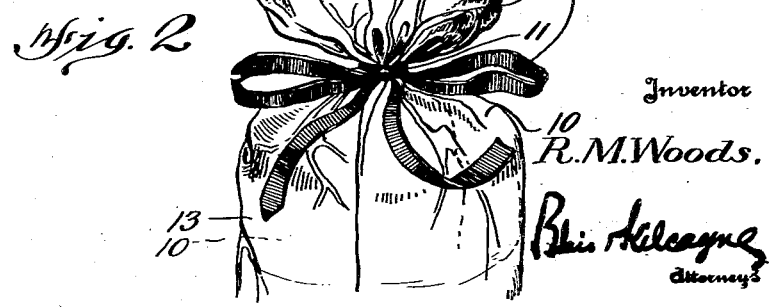
Inventor
R. M. Woods.

Patented Dec. 6, 1932                                              1,889,882

UNITED STATES PATENT OFFICE

ROBERT M. WOODS, OF CLEVELAND, OHIO, ASSIGNOR TO DRAKE BAKERIES INCORPORATED, OF BROOKLYN, NEW YORK, A CORPORATION OF NEW YORK

CONTAINER FOR FOOD PRODUCTS

Application filed November 11, 1931. Serial No. 574,416.

This invention relates to packages, and more particularly to a combination package of a food stuff, such as doughnuts, and a material such as powdered sugar with which the doughnuts may be dusted or coated subsequently. While the invention will be hereinafter described with particular relation to the packaging of doughnuts, it is of course to be understood that the invention is applicable in the packaging and treatment of other articles of food, such for example as sugared dates, salted peanuts, and the like.

In order that a clearer perception of the invention may be had, it is to be noted that, according to general practice, crullers are sugared, that is to say, dusted or coated with sugar, shortly after being cooked in fat or like substances. A certain amount of the cooking fat is thereupon absorbed by the sugar which takes on a greasy and unappetizing appearance while at the same time the fat absorption by the sugar causes the doughnuts to become prematurely dry and stale. Where the so sugared doughnuts have been packaged in display packages, such as in bags or containers of transparent material throughout, or having transparent portions through which the article may be viewed, it has been found that sugar particles adhere to the surface of the bags and thus cloud and impair the desired inspection and display features, while the greasy appearance of the articles, in the degree to which they may be inspected, makes for a generally unattractive package.

Accordingly, the present invention contemplates a package for, as well as a method of, treating doughnuts and like goods which avoids the objections heretofore experienced in that the freshly cooked doughnuts are packed in one part of the container, while the sugar or other treating material is packed in a separate compartment or chamber of the container, which chambers may be thrown into communication prior to unsealing the package thereby to dust the doughnuts with powdered sugar just prior to serving.

It is therefore one of the objects of the present invention to provide a simple and practical compartment container, preferably formed of transparent material such, for example, as cellophane or the like, which will hold the doughnuts securely in one portion and the dusting sugar in another portion.

A further object is to provide a package of the above character in which the two portions or chambers of the container may be easily and quickly thrown into communication. A further object is to provide a container of the above general character having a plurality of chambers or compartments for holding the doughnuts and sugar separated until it is desired to coat them, as well as to permit convenient removal of the doughnuts without being sugared if so desired. A further object is to provide a neat appearing and sanitary container for doughnuts and the like having a plurality of compartments as and for the purposes above described. A further object is to provide a package for food stuffs, such as doughnuts, in which the food articles may be attractively displayed and in which such articles possess a more palatable appearance than heretofore. A further object is the provision of a simple and useful method of treating food products such as doughnuts just prior to using or serving.

Other objects will be in part obvious from the annexed drawing and in part hereinafter indicated in connection therewith by the following analysis of this invention.

The invention accordingly consists in the features of construction, combination of parts, and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawing depicting a preferred form of the invention have been annexed as part of this disclosure, and in such drawing, like characters of reference denote corresponding parts throughout all of the views, in which—

Fig. 1 is a perspective of an unfilled container open at one end and sealed in any desired manner at the lower end;

Fig. 2 is a perspective view showing the container with doughnuts therein and closed so as to receive the sugar in its upper portion;

Fig. 3 is a perspective view of the finished package ready for display and sale.

Referring now to the drawing in detail, and more particularly to Fig. 1, there is illustrated in perspective a substantially cylindrical bag preferably formed from a single sheet 5 of cellophane or like material, the edges of which overlap at 6 and are sealed in any desired manner. The lower end of the container is folded on opposite sides as indicated by dotted lines 7 and 8 to form a closure and sealed in that position by means of adhesive of any desired character. After the forming of the open bag structure, the lower part is filled with a plurality of doughnuts, usually a half-dozen, as indicated at 10 in Fig. 2. Immediately above the upper doughnut, the sides of the bag are gathered or drawn in and tied with suitable means such as a cord or ribbon 11 having a bow-knot or other quick detachable fastening means 12. Such constriction and tying of the bag forms a doughnut compartment 13 in which the doughnuts are held in fixed and compact relation. The upper bag part, as shown clearly in Fig. 2, constitutes a second chamber 14 which is partially filled with the treating material, such as powdered sugar, as indicated at 15, and thereupon the top edge 16 of the bag is drawn or bunched together as shown in Fig. 3 and tied or secured in any desired manner as by means of cord 17. There is thus provided a complete self-contained package having upper and lower compartments, the lower being preferably filled with the doughnuts while the upper compartment 14 is filled with powdered sugar. The doughnuts may be inspected through the transparent, unobstructed wall of the container, and the completed package is thus adaptable for attractively displaying the goods.

Prior to serving the doughnuts, the bow-knot 12 is released, which permits the powdered sugar 15 to fall on the doughnuts and, passing through the central hole, to reach the interior of every one. The two compartments are thrown into communication and form one large compartment, and by shaking the bag, the doughnuts will move relatively back and forth, with the powdered sugar sifting to and dusting the surfaces of the doughnuts. When thoroughly sugared, the top string or ribbon 17 is pulled or removed whereupon the bag will assume the appearance of that shown in Fig. 1 and the doughnuts may be removed for serving. It is of course to be understood that the sugaring is optional and if it is not desired, the package may be inverted and the lower part of the bag unsealed for removal of the unsugared articles.

The above described method of packaging and dusting edible food products will be clear to those familiar with the subject and requires no further detailed explanation. The package provides a convenient mode of display and has an extremely neat and attractive appearance free from the objections heretofore incident to the packaging and shipping of goods of this character. In other words, the doughnuts, as seen through the transparent portion of the package, have their rich brown appearance, and the walls of the package are absolutely clear and transparent, instead of having the cloudy, semi-opaque appearance heretofore common in packages containing this character of goods.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. A package of the character described formed of a sheet of flexible material arranged to provide a container, and releasable means dividing the container into compartments adapted to hold food products of different nature, said means upon release being operative to throw said compartments into communication and being arranged about the container and operable from the exterior thereof.

2. The herein described package for containing edible products formed from a sheet of material rolled into tubular form and closed at one end to provide a container, a cord or the like disposed about the container for dividing the same into two compartments after the lower part has been filled with one food product, and means for closing the other end of the container after the upper part of the package has been filled with another product, said cord or the like adapted for removal whereby the two compartments are thrown into communication to permit the mixing of the two products.

3. A package of the character described formed of a sheet of flexible material arranged to provide a container, and releasable means dividing the container into compartments adapted to hold food products of different nature, said means upon release being operative to throw said compartments into communication and comprising a cord or the like surrounding the container and drawing the same into constricted condition, and means whereby either compartment may be emptied of its contents.

4. A package of the character described comprising a sheet of flexible material arranged to form a container having its lower end sealed, at least a portion of the sheet being transparent, a string or the like disposed about the container intermediate its ends and operative, after the lower portion of the container has been filled with a food product, to gather in the material and form a lower compartment, and means for closing the open end of the upper or other compartment after the same has been filled with a different food product.

5. A package of the character described comprising a sheet of flexible material arranged to form a container having its lower end sealed, at least a portion of the sheet being transparent, a string or the like disposed about the container intermediate its ends and operative, after the lower portion of the container has been filled with a food product, to gather in the material and form a lower compartment, and means for closing the open end of the upper or other compartment after the same has been filled with a different food product, said string being adapted for removal from the container to permit mixing of the contents of the two compartments within the container.

6. The herein described method of preparing sugared coated doughnuts or the like consisting in arranging the doughnuts in one compartment of a plural compartment container, placing powdered sugar or the like in another compartment of the container, sealing the last named compartment, throwing said compartments into communication, and shaking the container whereby to cause and permit the sugar to coat the doughnuts.

7. The method of sugaring doughnuts which consists in maintaining the sugar separate from the doughnuts in a single container, bringing the sugar and the doughnuts into contact while in said container, and shaking the container.

8. A package of the character described formed of a sheet of flexible material arranged to provide a container and releasable material constricting means cooperating with the container intermediate its ends to divide the container into compartments adapted to hold food products of different nature, said means upon release being operative to throw said compartments into communication.

Signed at Cleveland, Ohio, this seventh day of November, 1931.

ROBERT M. WOODS.